United States Patent
Lee et al.

(10) Patent No.: US 10,631,378 B2
(45) Date of Patent: Apr. 21, 2020

(54) DISPLAY APPARATUS

(71) Applicant: Samsung Display Co., Ltd., Yongin, Gyeonggi-Do (KR)

(72) Inventors: Sang Wol Lee, Yongin-si (KR); Dongwoo Seo, Seoul (KR); Gyeongho Jeong, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 270 days.

(21) Appl. No.: 14/338,530

(22) Filed: Jul. 23, 2014

(65) Prior Publication Data

US 2015/0173212 A1    Jun. 18, 2015

(30) Foreign Application Priority Data

Dec. 18, 2013 (KR) ........................ 10-2013-0158438

(51) Int. Cl.
*H05B 37/02* (2006.01)
*H04M 1/02* (2006.01)
*G06F 1/16* (2006.01)

(52) U.S. Cl.
CPC ........... *H05B 37/02* (2013.01); *G06F 1/1637* (2013.01); *H04M 1/0266* (2013.01); *H04M 1/0268* (2013.01); *H04M 2250/22* (2013.01)

(58) Field of Classification Search
CPC ........... H04M 1/0266; H04M 2250/22; H04M 1/0268; H05B 37/02; G06F 1/1637
See application file for complete search history.

(56) References Cited

U.S. PATENT DOCUMENTS

| | | | |
|---|---|---|---|
| 7,522,230 B2 | 4/2009 | Lee | |
| 8,189,128 B2 | 5/2012 | Takahashi et al. | |
| 2006/0087601 A1 | 4/2006 | Lee | |
| 2007/0145889 A1 | 6/2007 | Tamura et al. | |
| 2010/0293782 A1 | 11/2010 | Yamazaki et al. | |
| 2011/0095975 A1* | 4/2011 | Hwang | G06F 1/1626 345/156 |
| 2011/0234525 A1 | 9/2011 | Gettemy et al. | |
| 2012/0106063 A1* | 5/2012 | Mathew | G02F 1/133528 361/679.21 |
| 2013/0002133 A1 | 1/2013 | Jin et al. | |
| 2013/0002583 A1* | 1/2013 | Jin | G06F 1/1637 345/173 |
| 2013/0034685 A1 | 2/2013 | An et al. | |
| 2013/0241855 A1* | 9/2013 | Kim | G06F 3/041 345/173 |
| 2013/0342429 A1* | 12/2013 | Choi | H05K 13/00 345/30 |

(Continued)

FOREIGN PATENT DOCUMENTS

| | | |
|---|---|---|
| CN | 1761385 A | 4/2006 |
| CN | 1940660 A | 4/2007 |
| CN | 101533170 A | 9/2009 |

(Continued)

*Primary Examiner* — Kevin Quarterman
(74) *Attorney, Agent, or Firm* — Cantor Colburn LLP

(57) ABSTRACT

A display apparatus includes a display part and a housing that accommodates the display part. The display part includes a display panel configured to display an image on a front surface thereof, a flat portion, and an edge portion extended from a side of the flat portion and curved in a direction toward which the image is displayed.

31 Claims, 10 Drawing Sheets

(56) References Cited

U.S. PATENT DOCUMENTS

2014/0063719 A1 3/2014 Yamazaki et al.
2014/0140037 A1* 5/2014 Cho .......................... F21V 9/14
                                                                             362/19

FOREIGN PATENT DOCUMENTS

| CN | 102855822 A | 1/2013 |
|----|-------------|--------|
| CN | 103309499 A | 9/2013 |
| JP | 2007058188 A | 3/2007 |
| JP | 2007173084 A | 7/2007 |
| JP | 2009-271489 A | 11/2009 |
| JP | 2011003537 A | 1/2011 |
| JP | 2011-047976 A | 3/2011 |
| JP | 2013015835 A | 1/2013 |
| JP | 2013174777 A | 9/2013 |
| JP | 2014063159 A | 4/2014 |
| KR | 1020120098471 A | 9/2012 |
| KR | 1020130004085 A | 1/2013 |
| KR | 1020130007311 A | 1/2013 |
| KR | 1020130081617 A | 7/2013 |
| KR | 1020150017273 A | 2/2015 |

* cited by examiner

DISPLAY APPARATUS

This application claims priority to Korean Patent Application No. 10-2013-0158438, filed on Dec. 18, 2013, and all the benefits accruing therefrom under 35 U.S.C. § 119, the contents of which are hereby incorporated by reference in its entirety.

BACKGROUND

1. Field

The invention relates to a display apparatus. More particularly, the invention relates to a display apparatus including a display panel curved in one direction.

2. Description of the Related Art

A display apparatus employing a flat panel display panel, such as an organic light emitting display panel, a liquid crystal display panel, a field emission display panel, a plasma display panel, etc., is applied to various electronic devices, e.g., a television set, a mobile phone, etc.

In general, the display apparatus includes a display area in which an image is displayed and a peripheral area in which the image is not displayed, and the peripheral area is surrounded by a bezel. When a size of the bezel increases, a volume of the display apparatus becomes relatively large. Accordingly, to reduce the volume of the display apparatus and maintain the size of the display area, reducing the size of the bezel is desired.

SUMMARY

One or more exemplary embodiment of the invention provides a display apparatus capable of reducing a size of the bezel thereof.

Exemplary embodiments of the invention provide a display apparatus including a display part and a housing that accommodates the display part. The display part includes a display panel configured to display an image on a front surface thereof, a flat portion, and an edge portion extended from a side of the flat portion and curved in a direction toward which the image is displayed.

The display apparatus may further include a window panel on the front surface of the display panel and overlapping the flat portion of the display part.

The display part may further include a touch sensor on the front surface of the display panel and configured to sense a touch event generated by a user. The display part may further include a polarizing plate between the display panel and the window panel. The display part may further include a dummy film between the display panel and the polarizing plate.

The window panel may include a window film on the display part and configured to protect the display part. The window panel may further include a touch sensor between the window film and the display part and configured to sense a touch event generated by a user. The window panel may further include a polarizing plate between the display part and the window film.

The housing may include a bottom portion facing and substantially parallel to a rear surface of the display panel opposite to the front surface, a sidewall portion inclined from the bottom portion and in a direction in which the image is displayed, and a cover portion extending from the sidewall portion in a direction substantially parallel to the bottom portion. The cover portion may overlap an edge of the display panel in a plan view.

The edge portion of the display part may be in a space defined by the window panel, the bottom portion, the sidewall portion and the cover portion. A portion of the edge portion may be curved to have a predetermined curvature radius. A distance between an end of the window panel and the sidewall portion may be equal to or greater than the curvature radius. A portion of each of the bottom portion and the sidewall portion may have a surface curved which corresponds to the edge portion of the display part.

The housing may include a support portion between an end of the window panel and the edge portion of the display part. The support portion may be integral with the cover portion to form a single, unitary, indivisible body.

The flat portion of the display part may have a rectangular shape having four sides in a plan view. The edge portion may extend from a side among the four sides of the flat portion.

The display part may further include an auxiliary edge portion extended from a side among the four sides of the flat portion, at which the edge portion is not disposed, and curved in a direction opposite to the direction in which the edge portion is curved.

The display part may further include a printed circuit board at the side among the four sides of the flat portion, at which the edge portion is not disposed, and connected to the display panel.

According to one or more exemplary embodiment, the size of the bezel may be reduced and damage to the elements inside the display apparatus may be reduced or effectively prevented.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION

Figure 1:
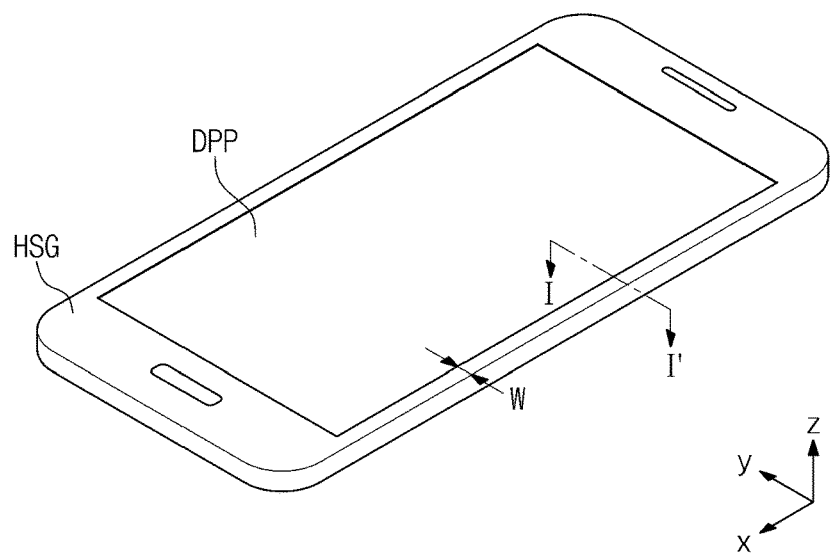
FIG. 1 is a perspective view showing an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
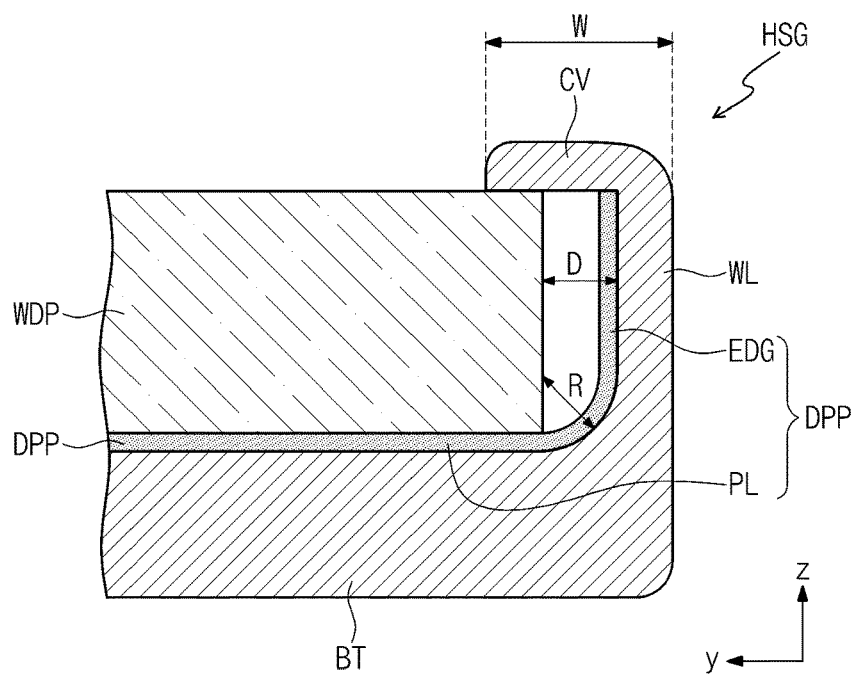
FIG. 2 is a cross-sectional view taken along line I-I' shown in FIG. 1.
Figure 3:
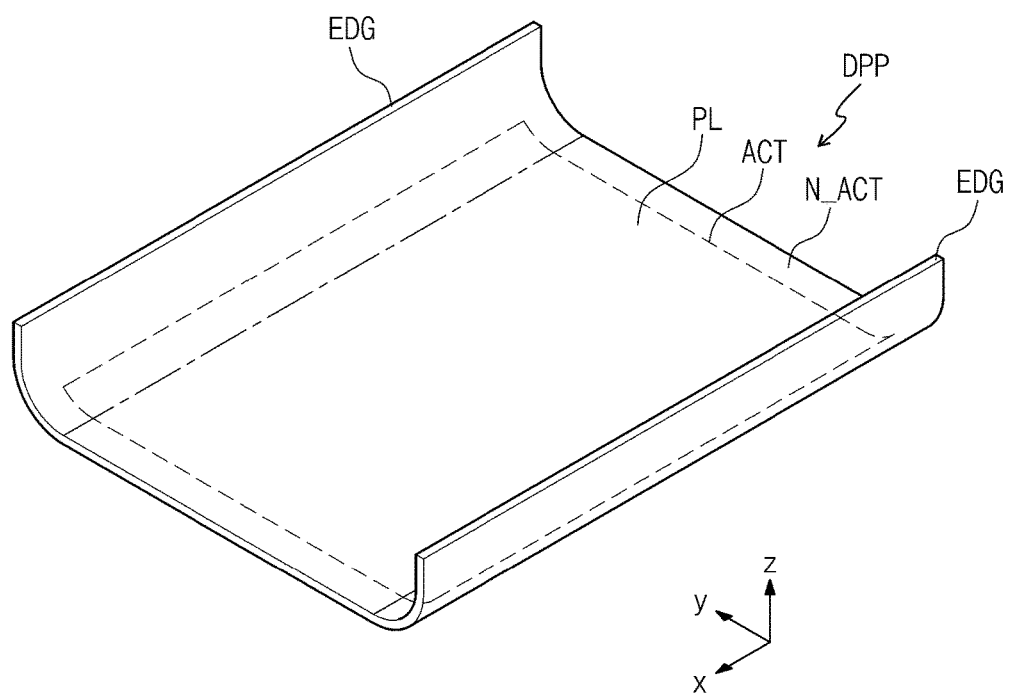
FIG. 3 is a perspective view showing an exemplary embodiment of a display part of a display apparatus according to the invention.

FIG. 1 is a perspective view showing an exemplary embodiment of a display apparatus according to the invention, FIG. 2 is a cross-sectional view taken along line I-I' shown in FIG. 1, and FIG. 3 is a perspective view showing an exemplary embodiment of a display part of a display apparatus according to the invention.

For the convenience of explanation, hereinafter, a surface on which an image is displayed is substantially in parallel to a surface defined by an x-axis and a y-axis, and a direction to which the image is displayed is referred to as a z-axis direction. In addition, the z-axis direction is referred to as an upper direction and a direction opposite to the z-axis direction is referred to as a lower direction. However, since the directions are relative concepts, the directions may be changed. For instance, the z-axis direction to which the image is displayed is described as the upper direction, but the z-axis direction to which the image is displayed may be described as a lower direction or a side direction.

In FIG. 1, an exemplary embodiment of the display apparatus according to the invention is applied to a mobile phone, but is not limited thereto or thereby. In another exemplary embodiment, for instance, the display apparatus may be applied to a large-sized electronic item, such as a television set, an outdoor billboard, etc., or a small and medium-sized electronic gadget, such as a personal computer, a notebook computer, a personal digital assistant, a navigation unit, a game unit, a mobile electronic device, a wrist-type electronic device, a camera, etc., but is not limited thereto or thereby.

Referring to FIGS. 1 to 3, the display apparatus includes a display part DPP, a window panel WDP disposed on the display part DPP, and a housing HSG that accommodates the display part DPP.

The display part DPP has various plate shapes and includes a front surface on which the image is displayed and a rear surface opposite to the front surface. The image is displayed in the z-axis direction from the front surface, and the rear surface faces the opposite direction to the z-axis direction.

In the front surface, the display part DPP includes an active area ACT in which an image is displayed and a non-active area N_ACT disposed at a position adjacent to at least one side of the active area ACT. In the illustrated exemplary embodiment, the non-active area N_ACT is provided around the active area ACT. Pixels used to display the image are arranged in the active area ACT in a matrix form.

The display part DPP may have a rectangular shape with two pairs of sides. The sides of each pair may be equal in length, and angles may be equal where the pairs meet. One of the two pairs of sides may be longer than the other of the two pairs of sides. In the illustrated exemplary embodiment, the display part DPP has the rectangular shape with a pair of long sides and a pair of short sides, a direction in which the long sides extend is referred to as the x-axis direction, and a direction in which the short sides extend is referred to as the y-axis direction.

The display part DPP includes a display panel that displays the image toward the z-axis. Further various films may be added to the display part DPP. In the illustrated exemplary embodiment, the shape of the display part DPP is substantially the same as that of the display panel.

According to an exemplary embodiment, the display panel may be an organic light emitting display panel, but is not limited to the organic light emitting display panel. That is, the display panel may be a plasma display panel, a liquid crystal display panel, an electrowetting display panel, an electrowetting display panel, a microelectromechanical system ("MEMS") display panel, etc. When the display panel is not-self emissive, a light source is provided at at least one side of the display panel. Details of the display panel will be described in detail later.

The display part DPP has flexibility in at least a portion thereof. In an exemplary embodiment, the entire area of the display part DPP may be a flexible area with the flexibility, but is not limited thereto or thereby. That is, the display part DDP may include the flexible area in which the flexibility exists and a rigid area in which no flexibility exists. When a line at which the display part DPP is folded or bent is referred to as a folding line, the folding line is located in the flexible area. The terms of "flexibility exists" and "no flexibility exists" and the terms of "flexible" and "rigid" used herein are relative concepts to describe properties of the foldable display apparatus. That is, the terms of "no flexibility exists" and "rigid" indicate the area in which the flexibility does not exist or the area in which the flexibility exists but is smaller than that in the flexible area.

The display part DPP may be individually provided in a flat shape and the flat shape of the display part DPP may be deformed to be curved after the display apparatus is assembled. The display part DPP may be curved in the flexible area. The terms of "curved" used herein means that the display part DPP is folded along the folding line and an angle at the folding area is approximate to or greater than a right angle.

The display part DPP includes a flat portion PL and an edge portion EDG disposed at at least one portion of the flat portion PL and curved in the z-axis direction toward which the image is displayed.

The flat portion PL has a rectangular shape with sides substantially in parallel to the sides of the display part DPP. The flat portion PL is not folded or curved in a certain direction. For instance, the flat portion PL is substantially parallel to an xy-plane. The terms of "flat" used herein means that the flat portion is relatively flat compared to the folded or curved portion. Accordingly, in the illustrated exemplary embodiment, the flat portion PL may be substantially parallel to the xy-plane, or convex or concave with respect to a user positioned at the front surface.

The edge portion EDG extends from at least one side among the four sides of the flat portion PL. In the illustrated exemplary embodiment, the edge portion EDG is disposed only at each long side of the display part DPP. The edge portion EDG is folded or curved in a direction at which the user is located.

In the illustrated exemplary embodiment, the active area ACT may be disposed in the flat portion PL. The non-active area N_ACT may be disposed in an end portion of the flat portion PL and in the edge portion EDG. However, positions of the active area ACT and the non-active area N_ACT are not limited thereto or thereby. In another exemplary embodiment, for instance, the active area ACT may partially extend into the edge portion EDG, such that the active area ACT may overlap with the flat portion PL and the portion of the edge portion EDG. In FIG. 3, the portion of the active area ACT overlaps with the edge portion EDG The window panel WDP is disposed on the front surface of the display part DPP, e.g., the surface on which the image is displayed. In the illustrated exemplary embodiment, the window panel WDP is disposed only on the flat portion PL of the display part DPP and is not disposed on the edge portion EDG. The window panel WDP covers the flat portion PL of the display part DPP and protects the display part DPP from external stresses and impacts.

The window panel WDP has a shape corresponding to the shape of the flat portion PL. That is, the window panel WDP has a rectangular shape corresponding to the flat portion PL in a plan view. The window panel WDP may have flexibility.

The window panel WDP has a cross-sectional thickness (in the z-axis direction) greater than that of the display part DPP, but is not limited thereto or thereby. That is, the window panel WDP may have a cross-sectional thickness smaller than that of the display part DPP as long as the window panel WDP protects the display part DPP.

The housing HSG accommodates the display part DPP and the window panel WDP and covers at least portions of the display part DPP and the window panel WDP to protect the display part DPP from external stresses and impacts.

The housing HSG includes a bottom portion BT, a sidewall portion WL and a cover portion CV.

The bottom portion BT is disposed at a lower portion of the display part DPP. An upper surface of the bottom portion BT is substantially parallel to a rear surface of the flat portion PL and the upper surface of the bottom portion BT may make contact with the rear surface of the flat portion PL. The bottom portion BT overlaps with the flat portion PL in a plan view.

The sidewall portion WL extends in the z-axis direction from the bottom portion BT and is substantially vertical to the bottom portion BT. The sidewall portion WL may be integral with the bottom portion BT to form a single, unitary indivisible member, but is not limited thereto or thereby. That is, the sidewall portion WL may be alternatively assembled with the bottom portion BT after being manufactured separately from the bottom portion BT.

The cover portion CV extends in a direction substantially parallel to the bottom portion BT from the sidewall portion WL. The cover portion CV covers at least a portion of the display part DPP. The cover portion CV covers the entire portion of the edge portion EDG in a plan view. The cover portion CV covers a portion of the flat portion PL or does not cover the flat portion PL. The cover portion CV may be integral with the bottom portion BT and/or the sidewall portion WL to form a single, unitary, indivisible member, but is not limited thereto or thereby. That is, the cover portion CV may be alternatively assembled with the bottom portion BT and/or the sidewall portion WL after being manufacture separately from the bottom portion BT and/or the sidewall portion WL.

The bottom portion BT, the sidewall portion WL and the cover portion CV form a space opened to the y-axis direction. Among portions of the display part DPP, the edge portion EDG is disposed in the space defined by the window panel WDP, the bottom portion BT, the sidewall portion WL and the cover portion CV.

In a cross-sectional view, a first end portion of the edge portion EDG is connected to the flat portion PL and an opposing second other end portion of the edge portion EDG is folded or curved at an angle vertical to the first end portion or approximate to a right angle. A portion of the edge portion between both end portions of the edge portion EDG is curved at a predetermined curvature radius R. The curvature radius R may be changed depending on a thickness, a degree of elasticity and/or a size of the space of display part DPP. A distance D between the sidewall WL and the end of the flat portion PL, which is connected to the edge portion EDG, or between the sidewall WL and the end of the window panel WDP, is the same as or greater than the curvature radius R.

In the illustrated exemplary embodiment, at least the portion of the bottom portion BT and the sidewall portion WL may have a curved surface or cross-sectional profile to correspond to the shape of the edge portion EDG curved at the curvature radius R.

In the plan view, the cover portion CV may serve as a bezel of the display apparatus, that covers an edge of the display part DPP. When the edge portion EDG is curved, a width W of the cover portion CV, e.g., a width of the bezel, may be minimized.

In addition, since the edge portion EDG is curved in the direction toward which the image is displayed, damage to elements provided to the display part DPP may be reduced or effectively prevented. This will be described in detail later. In the exemplary embodiment, a separate member may be further disposed on the cover portion CV to cover the cover portion CV. However, since the edge portion EDG is curved, the width of the bezel may be minimized.

In an exemplary embodiment, the display part may include an organic light emitting display panel as the display panel. The organic light emitting display panel includes a first electrode, e.g., an anode electrode, and a second electrode, e.g., a cathode electrode, and a light emitting layer including an organic material and disposed between the first electrode and the second electrode. When positive and negative voltages are applied to the first and second electrodes, respectively, holes injected from the first electrode move to the light emitting layer via a hole transport layer and electrons injected from the second electrode move to the light emitting layer via an electron transport layer. Then, the holes are recombined with the electrons to generate excitons, and the light emitting layer emits light by the excitons that return to a ground state from an excited state, thereby displaying the image.

Figure 4A:
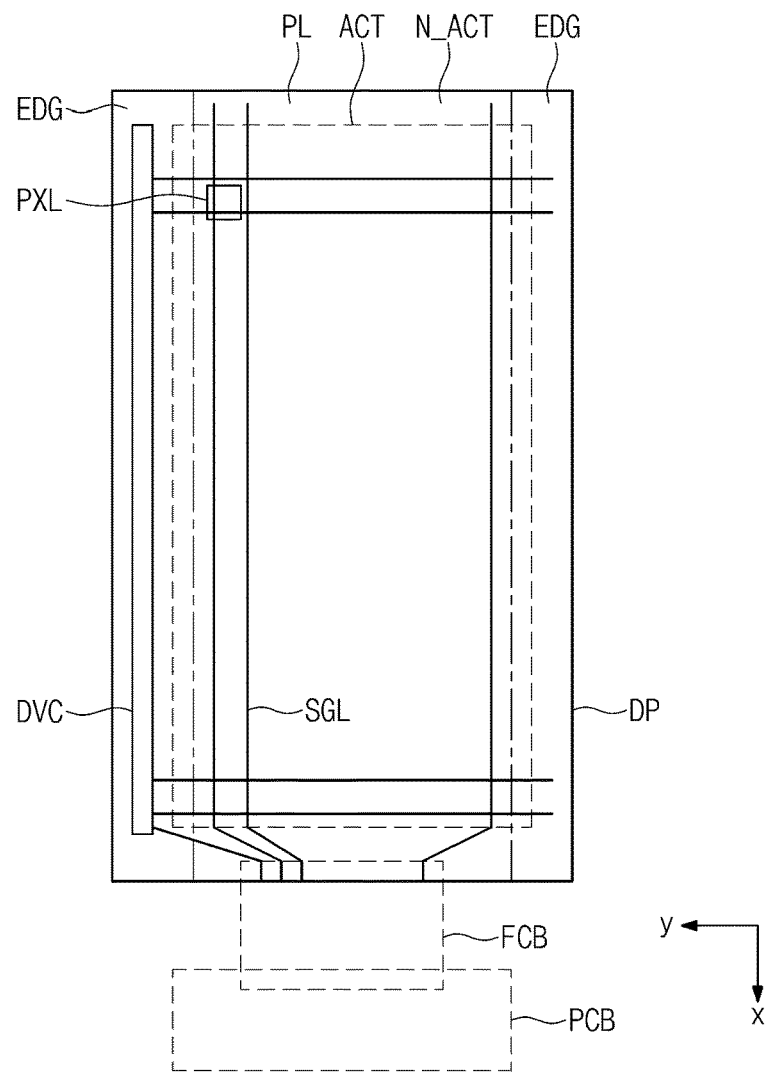
FIG. 4A is a plan view showing an exemplary embodiment of a display panel of a display apparatus according to the invention.
Figure 4B:
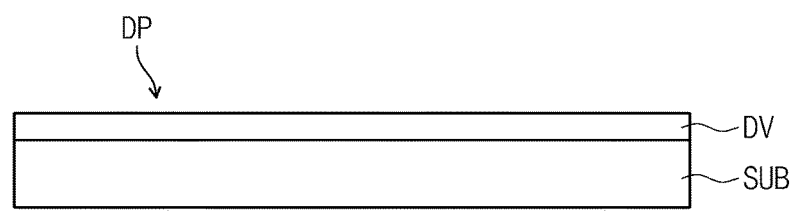
FIG. 4B is a cross-sectional view showing the display panel of FIG. 4A.
Figure 5:
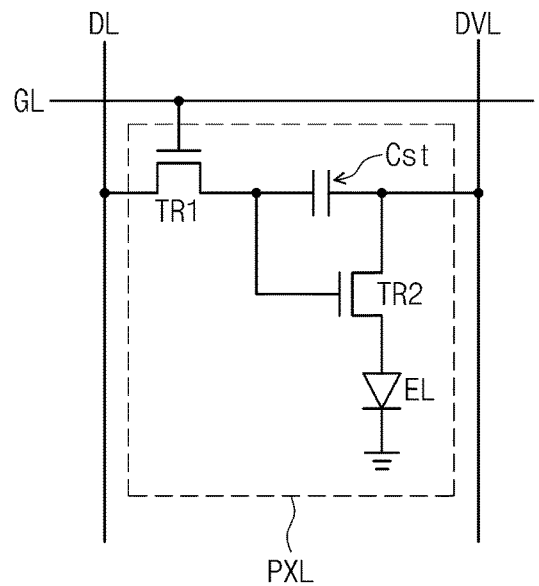
FIG. 5 is an equivalent circuit diagram showing an exemplary embodiment of a pixel shown in FIG. 4A.

FIG. 4A is a plan view showing an exemplary embodiment of a display panel of a display apparatus according to the invention, FIG. 4B is a cross-sectional view showing the display panel of FIG. 4A, and FIG. 5 is an equivalent circuit diagram showing an exemplary embodiment of a pixel shown in FIG. 4A.

Referring to FIGS. 4A, 4B and 5, the display panel DP includes a substrate SUB, and an electronic device DV disposed on the substrate SUB. The electronic device DV includes a driving circuit DVC that generates a signal, a signal line SGL that transfers the signal, and at least one pixel PXL that receives the signal from the signal line SGL to display the image.

The driving circuit DVC is disposed in the non-active area N_ACT. In an exemplary embodiment, the driving circuit DVC is mounted on the substrate SUB. The driving circuit DVC may be a gate driving circuit applying the signal to a gate line GL or a data driving circuit applying the signal to a data line DL. According to another exemplary embodiment, the driving circuit DVC may be omitted, such that the driving circuit DVC is disposed outside the display panel DP and connected to the signal line SGL.

The signal line SGL includes the gate line GL, the data line DL and a driving voltage line DVL and is disposed in the non-active area N_ACT and the active area ACT.

The gate line GL extends in a first direction and the data line DL extends in a second direction crossing the gate line GL. The driving voltage line DVL may extend in the same direction as the data line DL. The gate line GL transmits a scan signal to a thin film transistor, the data line DL transmits a data signal to the thin film transistor, and the driving voltage line DVL transmits a driving voltage to the thin film transistor.

The pixel PXL is disposed in the active area ACT to display the image. The pixel PXL includes the thin film transistor connected to the signal line, an organic light emitting device EL, and a capacitor Cst.

In an exemplary embodiment of the invention, the thin film transistor may include a driving thin film transistor TR2 to control the organic light emitting device EL and a switching thin film transistor TR1 to switch the driving thin film transistor TR2. In the illustrated exemplary embodiment, one pixel PXL includes two thin film transistors TR1 and TR2, but the number of the thin film transistors is not limited to two. That is, one pixel PXL may include one thin film transistor and a capacitor or one pixel PXL may include three or more thin film transistors and two or more capacitors.

The switching thin film transistor TR1 includes a gate electrode, a source electrode and a drain electrode. The gate electrode of the switching thin film transistor TR1 is connected to the gate line GL and the source electrode of the switching thin film transistor TR1 is connected to the data line DL. The drain electrode of the switching thin film transistor TR1 is connected to a gate electrode of the driving thin film transistor TR2. The switching thin film transistor TR1 applies the data signal received from the data line DL to the thin film transistor TR2 in response to the scan signal received from the gate line GL.

The driving thin film transistor TR2 includes the gate electrode, a source electrode and a drain electrode. The gate electrode of the driving thin film transistor TR2 is connected to the switching thin film transistor TR1, the source electrode of the driving thin film transistor TR2 is connected to the driving voltage line DVL, and the drain electrode of the driving thin film transistor TR2 is connected to the organic light emitting device EL.

The organic light emitting device EL includes the light emitting layer, and the first and second electrodes facing each other with the light emitting layer between the first and second electrodes. In an exemplary embodiment, the first electrode is the anode and the second electrode is the cathode. According to another embodiment, the first electrode may be the cathode and the second electrode may be the anode.

The first electrode is connected to the drain electrode of the driving thin film transistor TR2. The second electrode receives a common voltage, and the light emitting layer EML emits the light in response to the output signal from the driving thin film transistor TR2, thereby displaying the image.

The capacitor Cst is connected between the gate electrode of the driving thin film transistor TR2 and the source electrode of the driving thin film transistor TR2 and charged with the data signal received from the gate electrode of the driving thin film transistor TR2.

The display panel DP may further include a flexible printed circuit board FCB and a printed circuit board PCB. In FIG. 4A, the flexible printed circuit board FCB and the printed circuit board PCB are represented by dotted lines.

The printed circuit board PCB includes a control part (e.g., controller) to control the image and an output part (e.g., converter) to convert an image signal from the controller to a driving signal used to realize the image.

The flexible printed circuit board FCB transmits the driving signal output from the printed circuit board PCB to the signal line SGL. A first end of the flexible printed circuit board FCB is connected to the signal line SGL. A connection member such as an anisotropic conductive film or a connector may be connected between the flexible printed circuit board FCB and the signal line SGL. The signal line SGL has a fan-out shape in the area in which the signal line SGL is connected to the flexible printed circuit board FCB. An opposing second end of the flexible printed circuit board FCB is connected to the printed circuit board PCB. A connection member, e.g., an anisotropic conductive film or a connector, may be disposed between the flexible printed circuit board FCB and the printed circuit board PCB.

The flexible printed circuit board FCB and the printed circuit board PCB are disposed at the side of the flat portion PL, at which the edge portion EDG is not disposed. As described above, the edge portion EDG is disposed at each long side of the display part DPP, and thus the flexible printed circuit board FCB and the printed circuit board PCB are disposed at a short side of the display part DPP.

The flexible printed circuit board FCB has the flexibility and is folded or curved. Although not shown in figures, the flexible printed circuit board FCB may be folded along the edge of the display panel DP. In an exemplary embodiment, for instance, the flexible printed circuit board FCB is folded in a direction opposite to a direction in which the edge portion EDG is folded while the first end thereof is connected to the signal line SGL of the display panel DP, and thus the second end of the flexible printed circuit board FCB is disposed on the rear surface of the display panel DP. In addition, the flexible printed circuit board FCB may be folded along an outer surface of the housing HSG, so that the second end of the flexible printed circuit board FCB may be disposed on the rear surface of the display panel DP. In an exemplary embodiment, when electronic devices that serve as the flexible printed circuit board FCB and/or the printed circuit board PCB are mounted on the substrate SUB, the flexible printed circuit board FCB and/or the printed circuit board PCB may be omitted. Further, the flexible printed circuit board FCB may be integral with the printed circuit board PCB. Where the flexible printed circuit board FCB is integral with the printed circuit board PCB, a single circuit board including elements of the flexible printed circuit board FCB and the printed circuit board PCB may have the flexibility.

In one or more exemplary embodiment of the display apparatus having the above-mentioned structure, since a portion of the display part DPP is curved in the direction toward which the image is displayed, the width of the bezel may be minimized and damage to the elements on the display part DPP may be reduced or effectively prevented.

Figure 6:
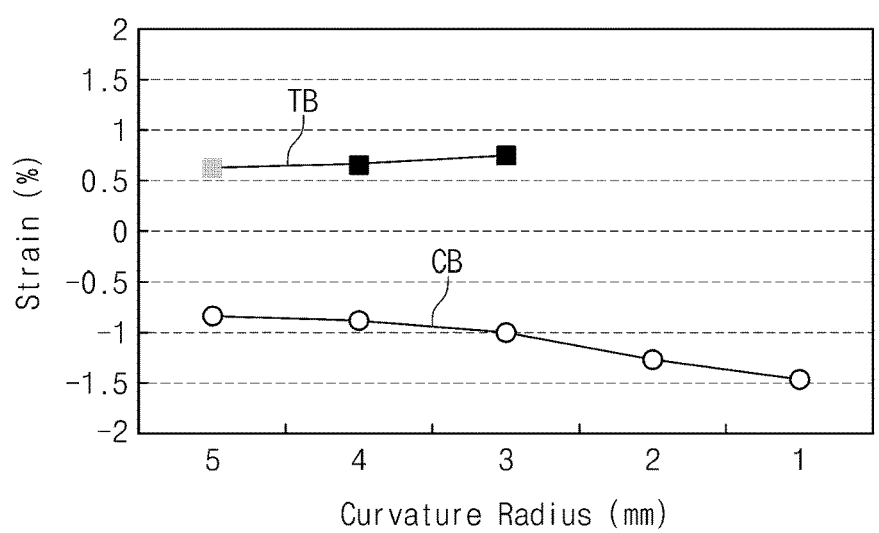
FIG. 6 is a graph showing a strain (percent: %) as a function of a curvature radius (millimeters: mm) in a display panel of a display part of a display apparatus.

FIG. 6 is a graph showing the strain (percent: %) as a function of the curvature radius (millimeters: mm) in the display panel of the display part. The strain of the display panel DP is measured with reference to the display panel DP in a normal state without the strain.

Figure 7A:
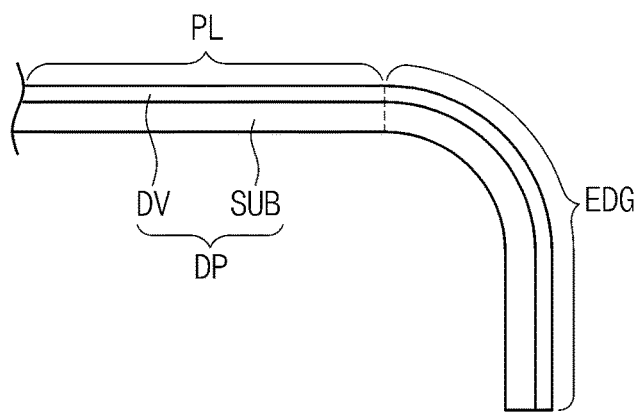
FIGS. 7A and 7B are a comparative example and an embodiment example, respectively, each showing display panels bent with a curvature radius in order to measure the strain as a function of the curvature radius.
Figure 7B:
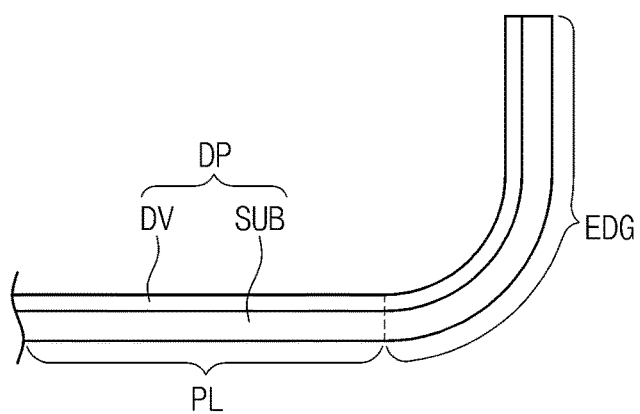

FIG. 7A is a comparative example, which is represented by "TB" in FIG. 6, and FIG. 7B is an exemplary embodiment according to the invention, which is represented by "CB" in FIG. 6, showing display panels bent with each curvature radius in order to measure the strain as a function of the curvature radius. In the comparative example and the exemplary embodiment, the display panel that includes the electronic device DV disposed on the substrate SUB and displays the image to the upper direction is used. In addition, the display panels of the comparative example and the exemplary embodiment have the same conditions before the display panels are curved.

In the display panel DP according to the comparative example, the edge portion EDG connected to the flat portion PL of the display panel DP is curved toward the substrate SUB rather than the electronic device DV, as shown in FIG. 7A. Therefore, a compressive force is applied to the substrate SUB and a tensile force is applied to the electronic device DV.

In the exemplary embodiment of the display panel DP according to the invention, the edge portion EDG connected to the flat portion PL of the display panel DP is curved toward the electronic device DV rather than the substrate SUB as shown in FIG. 7B. Therefore, the compressive force is applied to the electronic device DV and the tensile force is applied to the substrate SUB.

Referring to FIG. 6 again, the strain occurs in the display panel according to the comparative example even though the curvature radius becomes small. That is, the strain of about 1% occurs when the display panel according to the comparative example has the curvature radius equal to or greater than about 3 mm. However, when the curvature radius of the display panel DP is less than about 3 mm, the display panel DP is damaged so that the degree of the strain cannot be measured.

In contrast, the degree of the strain, in which the curvature radius of the exemplary embodiment of the display panel DP according to the invention is reduced, and is about −1.5% at maximum. The exemplary embodiment of the display panel DP according to the invention is not damaged until the curvature radius becomes equal to about 1 mm.

The graph shown in FIG. 6 demonstrates that the electronic device is more damaged when the tensile force is applied to the display panel DP than that when the compressive force is applied to the display panel DP. In particular, since the frequency of occurrence of cracks in the electronic device increases when a void is generated by a volume expansion, defects of the electronic device can be reduced when the display panel DP is curved to apply the compressive force to the electronic device rather than the tensile force. According to one or more exemplary embodiment of the display apparatus according to the invention, since the edge portion of the display part is curved in the direction toward which the image is displayed, the compressive force is applied to the electronic device instead of the tensile force, and thus damage to the electronic device may be reduced or effectively prevented.

In one or more exemplary embodiment of the display apparatus according to the invention, the window panel or the display part includes various elements. FIGS. 8 to 11 are cross-sectional views showing exemplary embodiments of a window panel WDP and a display panel DP in a display apparatus according to the invention.

Figure 8:
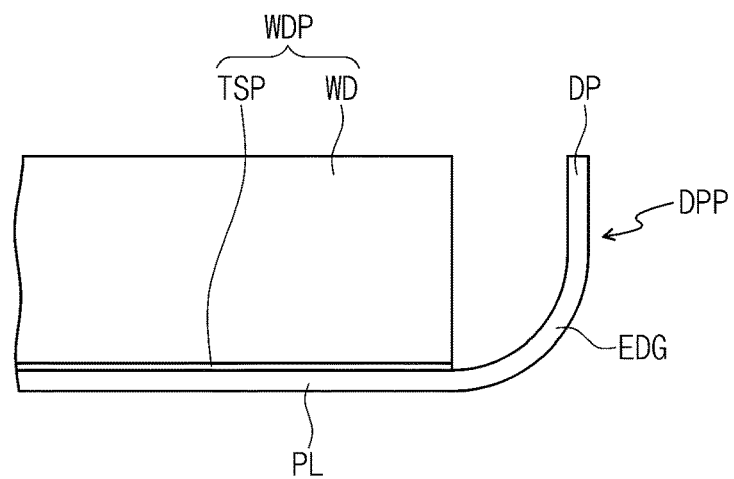
FIGS. 8 to 11 are cross-sectional views respectively showing exemplary embodiments of a window panel and a display panel in a display apparatus according to invention.

Referring to FIG. 8, the window panel WDP of the display apparatus includes a window film WD and a touch sensor TSP configured to sense a touch event generated by a user.

The window film WD includes a transparent material to allow the image to be displayed on the front surface of the display part DPP. The window film WD is disposed at an outermost position among positions each facing the housing HSG of the display apparatus, while the display panel DPP is disposed between the window film WD and the housing HSG.

The touch sensor TSP has substantially the same shape as that of the window film WD in a plan view. The touch sensor TSP overlaps with the flat portion PL of the display part DPP and is not disposed at the edge portion EDG.

The touch sensor TSP is disposed between the window film WD and the display part DPP. The touch sensor TSP is not limited to specific kind and shape. In an exemplary embodiment, for instance, the touch sensor TSP may be a capacitive touch sensor. According to another exemplary embodiment, the touch sensor TSP may be a resistive touch sensor, a sound touch sensor, an optical sensor or a piezoelectric sensor. In addition, the touch sensor TSP is disposed on the window film WD as an individual layer as shown in FIG. 8, but is not limited thereto or thereby. In an exemplary embodiment, for instance, the touch sensor TSP may be provided in plural numbers and/or disposed on a portion of the window film WD.

Figure 9:
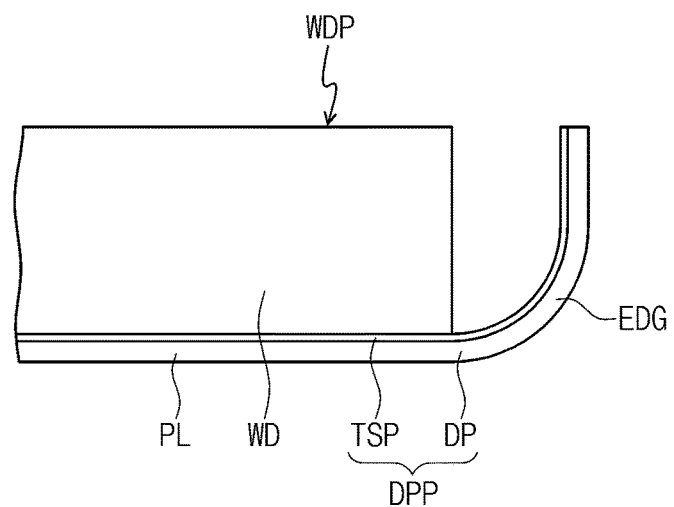

Referring to FIG. 9, the display part DPP of the display apparatus includes the display panel DP and a touch sensor TSP configured to sense a touch event generated by a user.

The touch sensor TSP is provided over the display panel DP and disposed between the display panel DP and the window panel WDP.

In an exemplary embodiment, since the touch sensor TSP has the same area and shape as those of the display panel DP in a plan view, the touch sensor TSP is disposed on the entire of the flat portion PL and the edge portion EDG of the display part DPP. The touch sensor TSP is curved together with the display panel DP at the edge portion EDG.

Figure 10:
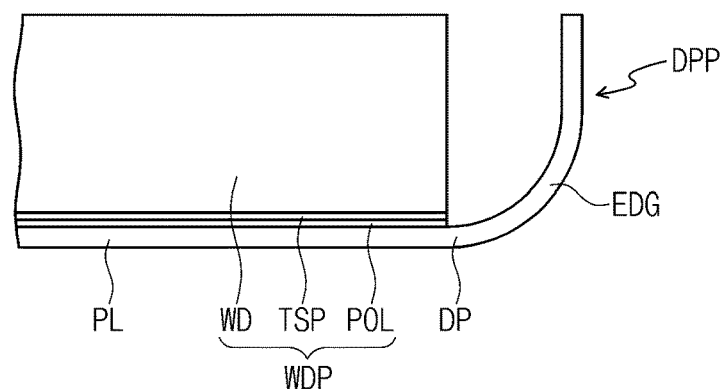

Referring to FIG. 10, the window panel WDP of the display apparatus includes a touch sensor TSP and a polarizing plate POL, which are sequentially stacked on the window film WD.

The polarizing plate POL is disposed between the touch sensor TSP and the display part DPP and is configured to polarize the light passing through the polarizing plate POL.

In a plan view, the polarizing plate POL has the same shape and area as those of the window film WD and/or the touch sensor TSP, and thus the polarizing plate POL is disposed to overlap with the flat portion PL of the display part DPP and is not disposed on the edge portion EDG.

In an exemplary embodiment, the touch sensor TSP and the polarizing plate POL are sequentially stacked on the window film WD, but are not limited thereto or thereby. That is, the positions of the touch sensor TSP and the polarizing plate POL may be changed relative to each other.

In addition, the touch sensor TSP may be omitted and only the polarizing plate POL may be disposed on the display panel DP.

Further, the polarizing plate POL may be replaced with another optical sheet. In an exemplary embodiment, for instance, the polarizing plate POL may be replaced with an optical compensation film and/or a dummy film. The dummy film is used to support the window panel WDP and does not have an optical function.

Figure 11:
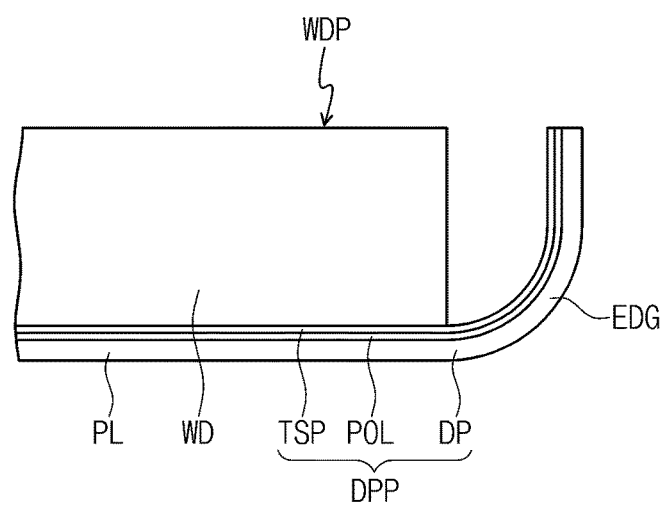

Referring to FIG. 11, the display part DPP of the display apparatus includes the display panel DP, a polarizing plate POL and a touch sensor TSP. The polarizing plate POL and the touch sensor TSP are sequentially stacked on the display panel DP.

The polarizing plate POL is disposed between the display panel DP and the touch sensor TSP and the touch sensor TSP makes contact with the window panel WDP.

The polarizing plate POL has the same area and shape as those of the display panel DP and/or the touch sensor TSP in a plan view, and thus the polarizing plate PL is disposed over the flat portion PL and the edge portion EDG of the display part DPP.

In an exemplary embodiment, the polarizing plate POL and the touch sensor TSP are sequentially stacked on the display panel DP, but the positions of the polarizing plate POL and the touch sensor TSP may be changed relative to each other. In addition, the touch sensor TSP may be omitted and only the polarizing plate POL may be disposed on the display panel DP.

Further, the polarizing plate POL may be replaced with another optical sheet. In an exemplary embodiment, for instance, the polarizing plate POL may be replaced with an optical compensation film and/or a dummy film. The dummy film is used to support the window panel WDP and does not have an optical function.

Although not shown in figures, the other layers may be included in the window panel WDP and/or the display part DPP except for or in addition to the layers shown in FIGS. 8 to 11. In detail, various functional layers, such as an adhesive layer, a pressure sensitive adhesive layer, a protective layer, an additional dummy layer, a reflection preventing layer, a scattering layer, etc., may be disposed at positions between the window film WD and the touch sensor TSP and between the touch sensor TSP and the polarizing plate POL.

Figure 12:
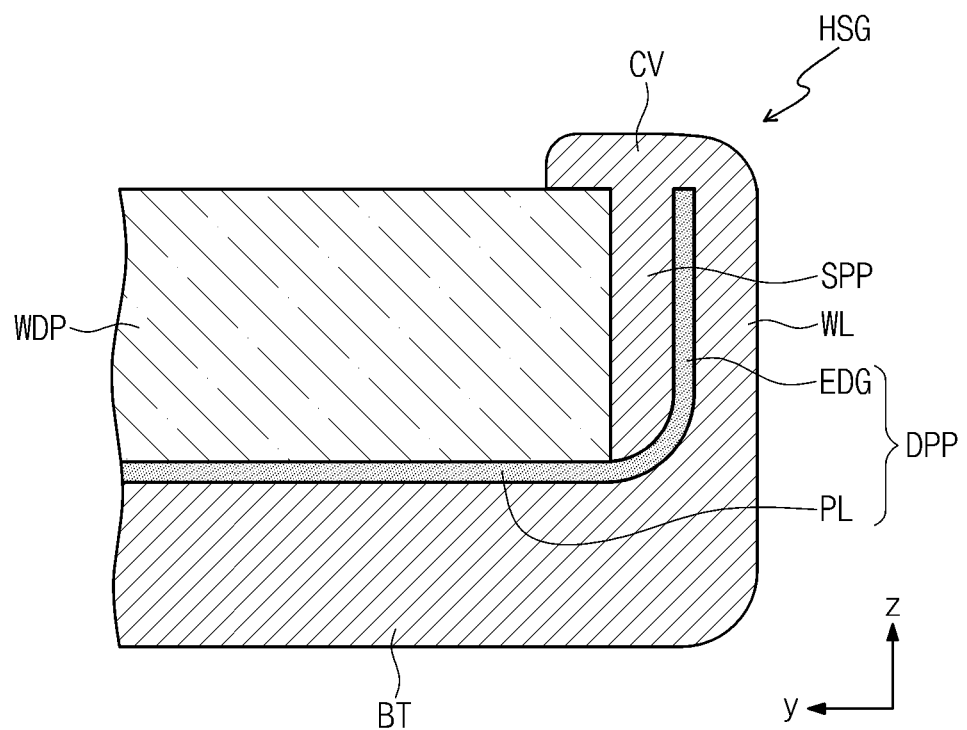
FIG. 12 is a cross-sectional showing another exemplary embodiment of a display apparatus according to the invention, taken along line I-I' shown in FIG. 1.

In exemplary embodiments of the display apparatus according to the invention, the housing of the display apparatus may have various shapes. FIG. 12 is a cross-sectional showing another exemplary embodiment of a display apparatus according to the invention, taken along line I-I' shown in FIG. 1. Hereinafter, different features of the housing shown in FIG. 12 will be mainly described.

Referring to FIG. 12, a housing HSG includes a bottom portion BT, a sidewall portion WL, a cover portion CV and a support portion SPP.

The support portion SPP stably supports the edge portion EDG and is disposed in a space defined by the bottom portion BT, the sidewall portion WL and the cover portion CV. In contrast, the space shown in FIG. 2 is empty.

The support portion SPP is protruded from the cover portion CV toward the bottom portion BT and at least a portion of the support portion SPP is substantially parallel to the sidewall portion WL. The support portion SPP is disposed in a space defined by the bottom portion BT, the sidewall portion WL, the cover portion CV and the window panel WDP. The support portion SPP is disposed between the window panel WDP and the edge portion EDG of the display part DPP to fill the space between the edge portion EDG and the window panel WDP. In the support portion SPP, a surface facing the edge portion EDG has the same shape as the shape of the edge portion EDG to correspond to the shape of the edge portion EDG, which is partially curved. The bottom portion BT and/or the sidewall portion WL have the same shape as the shape of the edge portion EDG to correspond to the shape of the edge portion EDG, which is partially curved. Therefore, a surface of the support portion SPP is spaced apart from a surface of the sidewall portion WL, which faces the surface of the support portion SPP, by a distance equal to or greater than a thickness of the edge portion EDG and is substantially parallel to the surface of the sidewall portion WL. The edge portion EDG is disposed in a space defined by the support portion SPP and the bottom portion BT and/or the sidewall portion WL. As a result, the edge portion EDG is stably held between the window panel WDP and the sidewall portion WL.

The support portion SPP may be integral with the cover portion CV and remaining portions of the housing HSG to collectively form a single, unitary, indivisible member, but is not limited thereto or thereby. That is, the support portion SPP may alternatively be assembled with the cover portion CV after being formed separately from the cover portion CV.

In one or more exemplary embodiment of the display apparatus according to the invention, the edge portion EDG may be provided in a plural number.

Figure 13:
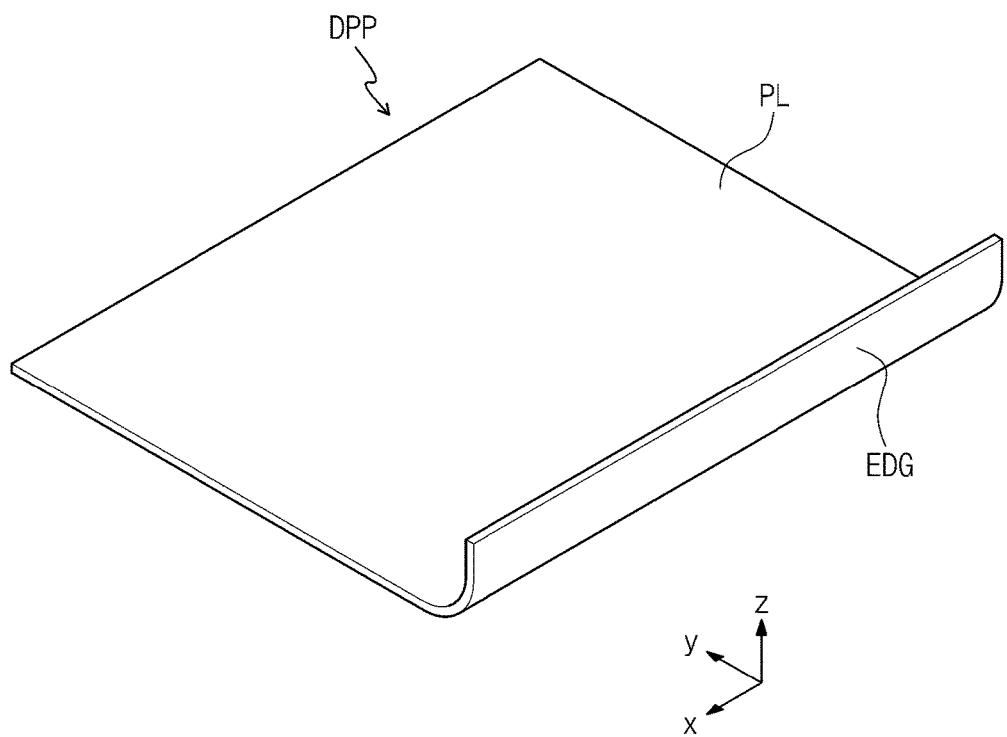
FIG. 13 is a perspective view showing another exemplary embodiment of a display part according to the invention.

FIG. 13 is a perspective view showing another exemplary embodiment of a display part according to the invention.

Referring to FIG. 13, the edge portion EDG is provided along at least one side among four sides of the flat portion PL of the display part DPP. In the illustrated exemplary embodiment, the edge portion EDG is disposed at only one side of the flat portion PL and along one of the long sides of the display part DPP. That is, the edge portion EDG extends in the x-axis direction.

In the display part DPP according to the illustrated exemplary embodiment, the non-active area corresponding to the side at which the edge portion EDG is provided, has a width different from a width of the non-active area corresponding to the side at which the edge portion EDG is not provided. In the illustrated exemplary embodiment, the width of the non-active area corresponding to the side at which the edge portion EDG is provided is greater than the width of the non-active area corresponding to the side at which the edge portion EDG is not provided. Driving circuits, e.g., gate and data driving circuits, may be disposed in the non-active area at the side at which the edge portion EDG is provided, and not disposed in the non-active area of the side at which the edge portion EDG is not provided.

In one or more exemplary embodiment of the display apparatus according to the invention, the edge portion EDG may have various shapes.

Figure 14:
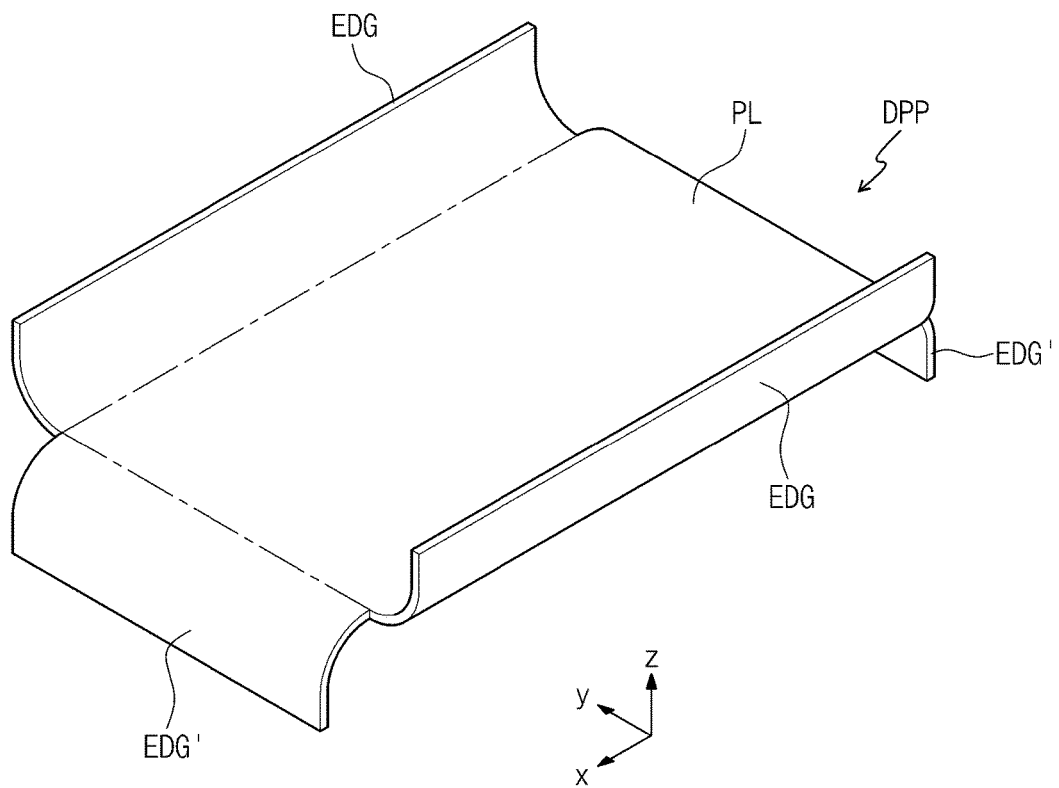
FIG. 14 is a perspective view showing still another exemplary embodiment of a display part according to the invention.

FIG. 14 is a perspective view showing still another exemplary embodiment of a display part according to the invention.

Referring to FIG. 14, the display part DPP includes a flat portion PL, an edge portion EDG disposed at at least one side of the flat portion PL and curved in the z-axis direction toward which the image is displayed, and an auxiliary edge portion EDG' disposed at one or more sides of the flat portion PL at which the edge portion EDG is not disposed, and curved in a direction opposite to the z-axis direction toward which the image is displayed. That is, the auxiliary edge portion EDG' may be curved to a direction that becomes farther from the active area of the display part DPP.

In an exemplary embodiment, the signal line and/or the driving circuit may be provided at the edge portion EDG and/or the auxiliary edge portion EDG'. The signal line and/or the driving circuit provided at the auxiliary edge portion EDG' may have different densities or different shapes from those of the signal line and/or the driving circuit provided at the edge portion EDG to reduce or effectively prevent damage to elements thereof when the auxiliary edge portion EDG' is curved in the opposite direction to the z-axis direction in which the image is displayed. In an exemplary embodiment, for instance, the signal line provided at the auxiliary edge portion EDG' may have a cross-sectional thickness and/or planar width greater than that of the signal line provided at the edge portion EDG.

In addition, the touch sensor, the polarizing plate, and at least one layer of the other layers may be provided at both of the edge portion EDG and the auxiliary edge portion EDG', but the invention is not limited thereto or thereby. That is, the touch sensor, the polarizing plate, and the other layers may be provided at only one of the edge portion EDG and the auxiliary edge portion EDG', or may not be provided to either of the edge portion EDG and the auxiliary edge portion EDG'. When the touch sensor, the polarizing plate, and at least one of the other layers are provided to only one of the edge portion EDG and the auxiliary edge portion EDG', the touch sensor, the polarizing plate, and at least one of the other layers may be stacked on the edge portion EDG and allow the layer on which the electronic devices are mounted to be on a neutral surface of the display part DPP in order to minimize a stress to the electronic devices.

Although exemplary embodiments of the invention have been described, it is understood that the invention is not limited to these exemplary embodiments but various changes and modifications can be made by one ordinary skilled in the art within the spirit and scope of the invention as hereinafter claimed.

What is claimed is:

1. A display apparatus comprising:
   a display part comprising a display panel configured to display an image on a front surface thereof; and
   a window panel on the front surface of the display panel and through which the image is displayed, the window panel comprising a side surface and a flat surface which extends from the side surface,
   wherein the display part defines:
      a flat portion thereof extended along the flat surface of the window panel toward the side surface of the window panel, the flat portion of the display part having plural sides defined in a plan view,
      the flat portion extended further than the side surface of the window panel to define an edge portion of the display part which is disposed at an end of the display apparatus, the edge portion being curved from a side among the plural sides of the flat portion and in a direction toward which the image is displayed, and
      an auxiliary edge portion extended from a side among the plural sides of the flat portion at which the edge portion is not disposed, the auxiliary edge portion curved in a direction opposite to the direction in which the edge portion is curved.

2. The display apparatus of claim 1, wherein the edge portion of the display part which is extended curved in the direction toward which the image is displayed faces the side surface of the window panel from which the flat portion of the display part is further extended.

3. The display apparatus of claim 1, wherein the display part further comprises a touch sensor on the front surface of the display panel and configured to sense a touch event generated by a user.

4. The display apparatus of claim 3, wherein the display part further comprises a polarizing plate between the display panel and the window panel.

5. The display apparatus of claim 4, wherein the display part further comprises a dummy film between the display panel and the polarizing plate.

6. The display apparatus of claim 1, wherein the display part further comprises a polarizing plate between the display panel and the window panel.

7. The display apparatus of claim 6, wherein the display part further comprises a dummy film between the display panel and the polarizing plate.

8. The display apparatus of claim 1, wherein the window panel comprises a window film on the display part and configured to protect the display part.

9. The display apparatus of claim 8, wherein the window panel further comprises a touch sensor between the window film and the display part and configured to sense a touch event generated by a user.

10. The display apparatus of claim 9, wherein the window panel further comprises a polarizing plate between the display part and the window panel.

11. The display apparatus of claim 8, wherein the window panel further comprises a polarizing plate between the display part and the window film.

12. The display apparatus of claim 1, further comprising a housing that accommodates the display part.

13. The display apparatus of claim 12, wherein the housing comprises:
a bottom portion facing and substantially parallel to a rear surface of the display panel opposite to the front surface;
a sidewall portion inclined from the bottom portion and in the direction toward which the image is displayed, the sidewall portion inclined corresponding to the edge portion extended curved in the direction toward which the image is displayed; and
a cover portion extending from the sidewall portion in a direction substantially parallel to the bottom portion,
wherein the cover portion overlaps a portion of an edge of the display panel in the plan view.

14. The display apparatus of claim 13, wherein at the end of the display apparatus, the edge portion of the display part is disposed between the side surface of the window panel and the sidewall portion of the housing, and between the bottom portion of the housing and the cover portion thereof.

15. The display apparatus of claim 14, wherein a portion of the edge portion is curved to have a curvature radius.

16. The display apparatus of claim 15, wherein at the end of the display apparatus,
the side surface of the window panel is spaced apart from the sidewall portion of the housing, and
a distance between the side surface of the window panel and the sidewall portion of the housing is equal to or greater than the curvature radius.

17. The display apparatus of claim 15, wherein a portion of each of the bottom portion and the sidewall portion of the housing has a curved surface which corresponds to the edge portion of the display part.

18. The display apparatus of claim 14, wherein at the end of the display apparatus, the housing further comprises a support portion between the side surface of the window panel and the edge portion of the display part.

19. The display apparatus of claim 18, wherein the support portion and the cover portion are a single, unitary, indivisible body.

20. The display apparatus of claim 1, wherein the flat portion of the display part has a rectangular shape having four sides in the plan view.

21. The display apparatus of claim 1, wherein the display part further comprises a printed circuit board at the side among the plural sides of the flat portion, at which the edge portion is not disposed, and connected to the display panel.

22. A display apparatus comprising:
a display panel configured to display an image on a front surface thereof,
a window panel on the front surface of the display panel; and
a housing configured to accommodate the display panel and the window panel, wherein
a flat portion and an edge portion are defined in the display panel, and the edge portion is extended from at least one side of the flat portion and curved in a direction toward which the image is displayed,
the window panel overlaps the flat portion in the direction toward which the image is displayed,
the window panel does not overlap the edge portion in the direction toward which the image is displayed, and
the housing comprises:
a bottom portion facing and substantially parallel to a rear surface of the display panel opposite to the front surface;
a sidewall portion inclined from the bottom portion and in the direction toward which the image is displayed; and
a cover portion extending from the sidewall portion in a direction substantially parallel to the bottom portion, the cover portion overlaps a portion of an edge of the display panel in a plan view.

23. The display apparatus of claim 22, wherein the display panel comprises a substrate, and an electronic device on a front surface of the substrate.

24. The display apparatus of claim 23, wherein the electronic device comprises:
a driving circuit which generates a signal;
a signal line which transfers the signal; and
a pixel which receives the signal from the signal line to display the image.

25. The display apparatus of claim 24, wherein the pixel comprises an organic light emitting device.

26. The display apparatus of claim 24, wherein the pixel is provided in the flat active area.

27. A display apparatus comprising:
a display part comprising:
a flat portion at which an image is displayed, the flat portion extended in first and second directions crossing each other to define a plane, and
the flat portion extended curved to define an edge portion curved in a direction toward which the image is displayed, and
a housing which accommodates the display part, the housing comprising:
a bottom portion which is flat and corresponds to the flat portion of the display part,
a sidewall portion inclined from the bottom portion and in the direction toward which the image is displayed to correspond to the edge portion of the display part,
a cover portion extending from the sidewall portion in a direction substantially parallel to the bottom portion, the cover portion overlapping a portion of an edge of the display part in a plan view, and
a support portion extending from the cover portion,
wherein the sidewall portion and the support portion are disposed on opposing sides of the edge portion of the display part.

28. A display apparatus comprising:
a window panel through which an image is displayed, the window panel comprising an upper surface and a lower surface facing each other, and a side surface which couples the upper surface and the lower surface to each other;
a display part comprising:

a flat portion at which the image is displayed, the flat portion extended in first and second directions crossing each other, and the flat portion extended further than the side surface of the window panel to define an edge portion of the display part which is curved in a direction toward which the image is displayed; and a touch sensor which senses a touch event generated by a user, the touch sensor disposed between the display part and the window panel, wherein the touch sensor extends along the flat portion of the display part and ends at the side surface of the window panel.

29. The display apparatus of claim 28, wherein the side surface of the window panel which couples the upper and lower surfaces of the window panel to each other, is spaced apart from the edge portion of the display part.

30. The display apparatus of claim 28, further comprising a housing that accommodates the display part, wherein a portion of the window panel which is exposed by the housing is flat.

31. The display apparatus of claim 28, further comprising a housing that accommodates the display part, wherein the housing comprises:

a bottom portion facing and substantially parallel to a rear surface of the display part, the bottom portion being flat;

a sidewall portion inclined from the bottom portion and in the direction toward which the image is displayed, the sidewall portion inclined corresponding to the edge portion of the display part; and a cover portion extending from the sidewall portion in a direction substantially parallel to the bottom portion.

* * * * *